United States Patent Office 3,016,734
Patented Jan. 16, 1962

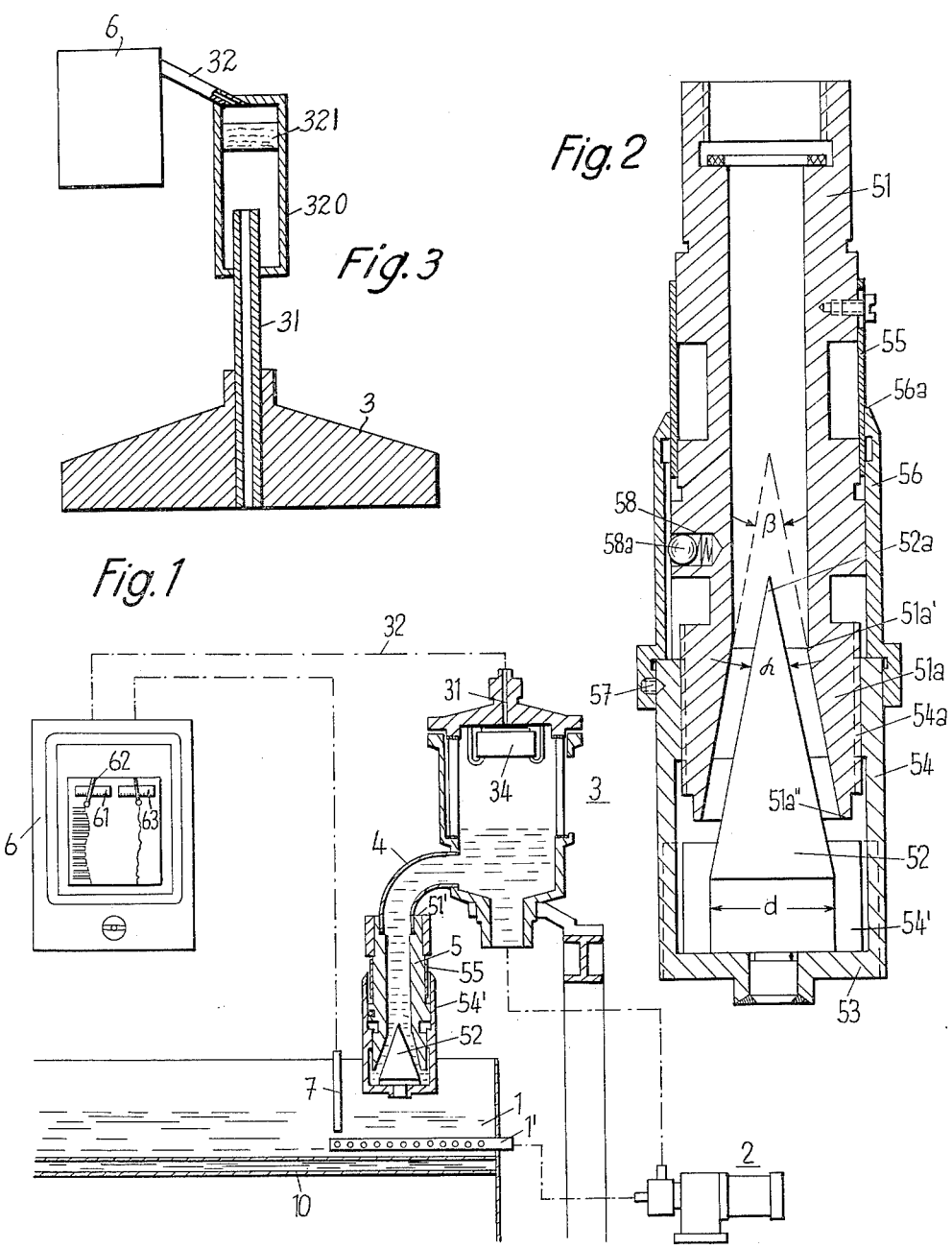

3,016,734
VISCOSITY SENSING OR MEASURING
APPARATUS
Hans Kabelitz and Toni von Kannen, M. Gladbach,
Germany, assignors to Gebruder Sucker G.m.b.H.,
M. Gladbach, Rhineland, Germany, a corporation of
Germany
Filed Feb. 21, 1958, Ser. No. 716,756
Claims priority, application Germany Feb. 23, 1957
12 Claims. (Cl. 73—55)

This invention relates to a system for sensing or measuring the viscosity of a liquid.

It particularly relates to a device for determining the qualities, such as viscosity, of a sizing material. Such material may comprise, for example, a size prepared from starch products by adding water and subjecting the suspension to controlled and progressive curing by application of heat. It is important to determine the correct processing stage of such sizes and their suitability for use, prior to or while applying them to threads.

This application is an improvement upon a copending application of Hans Kabelitz, Serial No. 491,160, filed February 28, 1955, now Patent No. 2,963,905. Said application describes a method and apparatus for concomitant measuring of temperature, viscosity, and stickiness of sizing suspensions. Details of operation and compatible disclosure of the said copending application are incorporated herein by reference.

The system of the prior application employs a viscosity meter comprising a flow chamber whose upper portion has an opening for connecting the chamber with a pressure measuring instrument. A fluid pressure space, preferably a gas pressure space, is located in the flow chamber above the level of the liquid being tested. This space is closed or sealed off relative to the measuring instrument, and relative to the pressure line leading to that instrument, by providing an elastically deformable body in the upper portion of the flow chamber, which body varies in volume content, under pressure, and transmits its volumetric change to the measuring instrument. By virtue of this elastic body, the specimen liquid, for example a starch size liquid, cannot enter into the pressure line and into the measuring instrument. This could be caused by a servicing error, namely, when the outlet opening of the viscosity meter is adjusted to an excessively small value. It has already been mentioned in the prior patent application that the measuring device may be cleaned and supervised from time to time by pumping water through the viscosity meter. In order to determine the viscosity value of the water, which is a few powers of ten lower than the viscosity of size liquid, it is necessary to greatly reduce the outlet cross section. If, subsequently, sizing liquid is passed through the viscosity meter, and the attendant should forget to correspondingly increase the outlet cross section, the size liquid within the viscosity meter may reach such a high level that it will eventually penetrate into the measuring line and the measuring instrument. The elastically deformable body in the upper part of the flow chamber, therefore, has the purpose of preventing the penetration of liquid into the pressure line. The body also prevents the penetration of vapors which may precipitate in the pressure line or the measuring instrument and may result in falsification of the measuring results.

However, it has been found that the elastic body may also be the cause of measuring errors, because under certain conditions sizing material may adhere to the surface of the body, and may harden, so that a reliable deformation of the elastic body is no longer obtained.

One object of the present invention is to eliminate this source of trouble. According to one significant aspect of the present invention, the measuring instrument is kept in direct communication with the pressure space forming itself in the viscosity meter above the measuring liquid, and this direct communication is maintained at least during the measuring operation proper. In other words, the elastically deformable body or any other partitioning wall between the pressure space above the size level and the pressure line leading to the instrument is eliminated.

In order to still prevent the penetration of specimen liquid, the outlet opening of the viscosity meter is preferably made closable. It is of advantage to provide for automatic closing of the exit opening in dependence upon the height or level of the size in the viscosity meter. More specifically, a float may be provided in the flow chamber which closes the outlet opening when the level of the size in the meter increases beyond a given height.

The above-mentioned float prevents a penetration of specimen liquid into the pressure line and the measuring instrument. However, during normal operation it is still possible that vapors may enter into the pressure line and these may have the effect of causing the formation of condensing water, which can ultimately affect the measuring result.

According to another feature of the invention, therefore, the connecting line between the pressure chamber and the measuring instrument is so designed that it possesses a downward gradient from the measuring instrument to the pressure chamber of the viscosity meter. It is also advantageous to select the diameter of the connecting line so that the force of adhesion of the water to the walls of the line is smaller than the component of gravity that acts upon the condensed water and returns the water back to the viscosity measuring device. For that reason it is preferable to make the diameter of the connecting line larger than 3.0 mm.

Furthermore, an approximately vertical hollow body or vessel may be disposed between the connecting line and the measuring instrument, the lower end of the hollow body being adapted to be closed and being located at a lower point than the location where the connecting line is connected to the measuring instrument. However, if it should nevertheless happen that water of condensation is formed ahead of the measuring device or also within the measuring device, then such water flows into the above-mentioned hollow body and can be drained from its lower end, for instance, by loosening a screw plug.

It is advantageous to so design the hollow body that it may receive a liquid-absorbing mass, for example, a silica gel cartridge. To prevent damaging the measuring instrument by faulty servicing of the viscosity meter, the meter may be protected in known manner from over pressure and under pressure.

Another aspect of the present invention relates to an improvement in the viscosity meter characterized in that the restriction of variable cross section comprises a gradually widening channel portion which surrounds a thorn or pin whose depth of penetration is varied. In a preferred form, both the gradually widening channel portion and the thorn protruding into that portion have conical shapes. The angle formed by the point of the cone may be the same in the channel portion and in the thorn. However, it is preferably if the angle of the thorn is somewhat larger than that of the channel portion, particularly if the two angles are so related to each other that the cross section of the path traversed by the specimen substance, for instance the size, is constant within the restriction.

In order to adapt or adjust the cross section with respect to the respective viscosities of different liquids, the depth of penetration of the thorn relative to the channel portion, and thus the flow cross section available for the liquid to be tested, is made variable. It is advantageous to provide a device to indicate the depth of penetration or/and the corresponding channel cross section. For this purpose the thorn may be mounted within a hollow cylinder whose inner diameter is preferably larger than the largest diameter of the thorn cone, the cylinder being provided with an interior screw thread engaging an exterior thread of the channel member through which the liquid or size passes. Depending upon the extent to which one cylinder is screwed onto the other, the thorn penetrates to a greater or smaller depth into the gradually widening channel portion and thus narrows the flow cross section. The indication of the penetrating depth, in this case, can be effected in a simple manner by providing a measuring device at or on the outside of the size-passing channel, which device is covered or uncovered by the hollow cylinder that receives the thorn cone, to an extent depending upon the number of cylinder rotations.

The invention will be further described with reference to the preferred embodiments illustrated in the drawings in which:

FIG. 1 is a schematic and partly sectional view of a system for measuring the viscosity of a sizing agent for the preparation of textile material to be woven;

FIG. 2 is a detailed cross-sectional view of an improved device providing the restricted passage of variable cross section located in the size exit path of the viscosity meter. It will be understood that the device of FIG. 2 is not identical with that used in FIG. 1, being an improvement thereover;

FIG. 3 is a schematic view of a condensate trap connected with the system at a point ahead of the indicating instrument.

In FIG. 1 the size is drawn, through perforated pipe 1', from a container 1, or from a size-storing tank (not illustrated), by motor-driven pump 2. At 10 is a heater for the size. The size passes from below into the viscosity meter 3. From meter 3 the size passes, through conduit 4 and restricted passage device 5, back into the size tank. The quantity of size flowing through the restriction 5 back into the tank 1 depends, on the one hand, upon the flow cross section available to the size within the restriction device 5 and, on the other hand, upon the viscosity of the size. If the cross section within the restriction remains constant, a smaller quantity per time unit will pass back into the size tank 1 when the viscosity of the size increases. Consequently, the size will collect in the viscosity meter 3 and, as described in the copending application, will operate to compress gas located or contained in the upper portion of the viscosity meter. The gas passes through the outlet 31 and the line 32 to the measuring device 61 of the measuring apparatus 6. The pointer 62 of the device is displaced in dependence upon the gas pressure. The device may also be provided with a recorder in order to indicate the changes in pressure upon a paper strip 60. In order to prevent entry of the size into outlet duct 31 and line 32, when the viscosity meter is improperly operated, a liquid lock or seal, comprising a float 34, is provided ahead of the exit duct 31. When the level of the size in meter 3 rises excessively, the float 34 closes the opening of the duct 31. Aside from the viscosity, the temperature of the size is also significant for determining the preparatory state of the sizing agent. For that reason, a temperature sensitive device 7 is mounted in the size tank 1. The temperature characteristic sensed by device 7 is supplied to a second component 63 of the measuring device 6. The measured temperature value is visually indicated, and may also be recorded on the paper strip mentioned above.

In FIG. 2 is shown a particularly advantageous form of the flow-restricting device. The restricting device according to this embodiment comprises a tubular channel member 51 whose bore widens gradually in the lower portion 51a. The thorn cone 52 protrudes into the gradually widening channel portion 51a. The channel portion 51a and the tapered part of thorn 52 each have a conical shape. The thorn 52 is mounted in a hollow cylinder 54 by means of a bridging piece 53. The liquid enters the lower part of cylinder 54 through lateral openings 54'. Piece 53 preferably holds the thorn fixedly, at the bottom. The inner diameter of the hollow cylinder 54 is larger than the largest diameter $d$ of the thorn cone. As a result, the liquid passing downwardly between the conical part of thorn 52 and the gradually widening channel portion 51a can flow, without further hindrance, between the thorn 52 and the hollow cylinder 54, and back into the size tank.

The hollow cylinder 54 is provided with an interior thread 54a which engages an exterior screw thread of the tubular channel member 51. It will be evident that, depending upon how far the hollow cylinder 54 is screwed onto the channel member 51, the thorn 52 will protrude to a greater or lesser depth into the cylinder 51. In this manner, the annular passage available between the thorn cone 52 and the channel portion 51a can be varied.

It will be noted that the angle at the point or tapered part 52a of the thorn 52, that is, the angle $\alpha$, is slightly larger than the angle $\beta$ formed by the channel portion 51a. These two angles are preferably so correlated that the cross section at area of the flow path available to the size within the restriction, that is, from the point 51a' to the point 51a'', is constant. However, these angles can also be made equal.

A measuring device or indicating scale 55 may be mounted by screws on the channel member 51, in order to indicate the depth of penetration of the thorn 52 into the channel member 51. The channel member 51 is further provided with a latching device 58 comprising a ball 58a which is resiliently and/or rotatably mounted in the wall of the channel member and is engageable with a number of mutually lengthwise spaced recesses in the inner side of the hollow cylinder. This latching device has the advantage that certain especially useful settings can readily be adjusted, with the assistance of the indicating scale 55.

It has already been mentioned, in connection with the embodiment described in Serial No. 491,160, now Patent No. 2,963,905, that it is advantageous to flush the viscosity meter with water from time to time. At the same time, the viscosity meter may be calibrated, the viscosity of the water being known. It is obvious that in this case, in order to obtain acceptable measuring values, the thorn 52 must protrude considerably more deeply into the channel portion 51a, to make the flow cross section considerably narrower. It is feasible and advantageous to dispose the arresting device 58 in such a manner that it determines a given location for water and another given location for the size.

In order to provide for a first adjusting when manufacturing the device, it is advantageous, instead of providing for vertical displacement of the scale 55, to connect the hollow cylinder 54 with a second cylinder 56 which extends up to the measuring device, and to locate the recesses for the arresting device 58 in this second hollow cylinder 56. If desired, the hollow cylinder 56 may be rotatable relative to the hollow cylinder 54 and may be provided with a screw 57 for securing it in fixed position relative to hollow cylinder 54. In this embodiment, the second hollow cylinder 56, particularly the upper edge 56a thereof, may serve for indicating the adjustment on the scale 55.

The performance of the above-described device resembles essentially that of the embodiment described in Serial No. 491,160, now Patent No. 2,963,905, with the difference, however, that in the method or procedure carried out according to the present improvement, the measuring of the adhesive force, or sticking property, need not be performed subsequent to the viscosity measurement, the size liquid passing from the viscosity measuring vessel 3 through the restriction 5 being returned directly into size tank 1. It is advantageous not to keep the size in continuous circulation, by the pump. It is preferable that such circulation be effected only at time intervals. This keeps the load on the drive motor down. For example, circulation of size may take place every four minutes and may be accompanied each time with a recording operation in measuring instrument 6, whereas subsequently the pump runs for ten to twenty seconds in the opposite direction without delivering any liquid, be it the size from the tank 1 or scavenging liquid in form of water or the like. In this manner, there is recorded on the recording strip of the measuring instrument 6 a measuring curve similar to the one illustrated at 60 on the left-hand side of the strip. In certain cases it is also advantageous to have restricted-path device 5 partly immersed in the liquid contained in the size tank 1, so that when the pump 2 reverses its delivering direction size is sucked from tank 1 through the restricting device 5. In this case, a negative pressure occurs within the viscosity meter 3, which can likewise be used as a criterium for the viscosity. In this case, of course, it is necessary to use a measuring mechanism 62 capable of indicating positive and negative pressures.

The apparatus can be used not only for visual or auditory indication or recording of the viscosity of the progressively curing heated starch size, but also for automatic control of the curing process.

Parts 51' and 54' of FIG. 1 correspond in function to parts 51 and 54—56 of FIG. 2.

In order to eliminate any water of condensation that may form within the line 32, the line 32 is so arranged that a greater or lesser amount of downward gradient is always provided from the measuring instrument 6 to the outlet conduit 31. The drawing is schematic and this gradient is not shown in FIG. 1, for convenience of illustration. In FIG. 3a vessel 320, mentioned above, is mounted approximately vertically between the connecting line 32 and the measuring instrument 6. The lower portion of vessel 320 is designed for the reception of water of condensation, and if desired may receive a moisture-absorbent mass such as a gel cartridge 321. It may generally be located behind the measuring instrument 6. The diameter of line 32 is preferably greater than 3 mm., for reasons explained above.

The condition or degree of preparation of the size depends not only upon viscosity but also upon temperature, as is already explained in the prior patent application. For this reason a temperature sensitive device 7 is mounted in the size tank 1. The measured value is transmitted to a second measuring component 63 of the instrument 6. The measured temperature value is likewise recorded on the paper strip 60.

The invention is not limited to the embodiments illustrated, and includes modifications within the teaching thereof and obvious to persons skilled in the art. For example, instead of providing for closure of the outlet duct 31 by means of the float 34, the outlet opening may also be closed by other known means which, if desired, may be actuated automatically by known control and regulating means in dependence upon the height of the liquid level in the device.

The pressure measuring device can be secured against excessive over-pressure and excessive negative pressure in a known manner.

We claim:

1. An apparatus for sensing the viscosity of a liquid material comprising a pressure chamber into which the material is introduced, channel means providing a conical restricted passage for outlet of liquid from said chamber widening in the liquid outlet flow direction, and conical means widening in the same direction and manually settable in rigid fixed position in said conical passage to determine the cross-sectional area of the annular restricted passage between the conical means and the conical passage, the tapering angle of the conical means being greater than that of the conical passage, the angles being so correlated that the cross-sectional area of the flow path is substantially constant over the length of the conical passage, means sensing gas pressure in said chamber, which pressure is affected by inflow of the liquid material and restriction of outflow of liquid material, and thereby sensing the viscosity of the material.

2. A system for sensing the viscosity of a liquid material comprising a source means for the liquid, a pressure chamber into which the material is forced from the source means, channel means providing a conical restricted passage for outlet of liquid from said chamber widening in the liquid outlet flow direction and conical tapered means rigidly fixable in position in said passage, the tapering angle of the conical means being greater than that of the conical passage, the angles being so correlated that the cross-sectional area of the flow path is substantially constant over the length of the conical passage, the conical means and the channel means being mutually adjustable lengthwise to variably control the cross-sectional area of the restricted passage, means sensing gas pressure in said chamber, which pressure is affected by inflow of the liquid material and restriction of outflow of liquid material, and thereby sensing the viscosity of the material, and means giving an indication correlative with the position of the tapered means in the channel means.

3. A system for sensing the viscosity of a liquid material comprising a source means for the liquid, a pressure chamber into which the material is forced from the source means, channel means providing a restricted passage for outlet of liquid from said chamber widening in the liquid outlet flow direction and tapered means in said passage, the tapered means and the channel means being mutually adjustable lengthwise to variably control the cross-sectional area of the restricted passage, means sensing gas pressure in said chamber, which pressure is affected by inflow of the liquid material and restriction of outflow of liquid material, and thereby sensing the viscosity of the material, and means giving an indication correlative with the position of the tapered means in the channel means, and means to latch the channel means with respect to the tapered means in at least two different lengthwise positions, the settings thereof being indicated on the scale.

4. A system for sensing the viscosity of a liquid material comprising a source means for the liquid, a pressure chamber, means to force the liquid material from the source means into the pressure chamber, downwardly directed channel means providing a restricted conical tapering passage for outlet of liquid from said chamber, the passage widening downwardly in the liquid outlet flow direction, and conical, upwardly tapered means rigidly positioned in said passage to determine the cross-sectional area of the restricted passage, the tapering angle of the conical means being greater than that of the conical passage, the angles being so correlated that the cross-sectional area of the flow path is substantially constant over the length of the conical passage, a tubular, liquid outlet member to support the tapered means, said member having a maximum internal diameter greater than the largest diameter of the tapered means, the tubular liquid outlet member having interior screwthreads, the channel means having exterior screw threads engaging the interior threads to provide mutual lengthwise adjustability, means sensing gas pressure in said chamber, which pressure is affected by inflow of the liquid material and restriction of outflow of liquid material, and thereby sensing the viscosity of the material.

5. A system for sensing the viscosity of a liquid material comprising a source means for the liquid, a pressure chamber, means to force the liquid material from the source means into the pressure chamber, channel means providing a restricted conical tapering passage for outlet of liquid from said chamber, the passage widening in the liquid outlet flow direction, and conical tapered means variably positionable in a number of positions in said passage to variably determine the cross-sectional area of the restricted passage, the tapering angle of the conical means being greater than that of the conical passage, the angles being so correlated that the cross-sectional area of the flow path is substantially constant over the length of the conical passage, a tubular, liquid outlet member to support the tapered means, said tapered means being immovable when so supported in said positions, said member having a maximum internal diameter greater than the largest diameter of the tapered means, the tubular liquid outlet member having interior screwthreads, the channel means having exterior screw threads engaging the interior threads to provide mutual lengthwise adjustability, the position of the outlet member on the channel means giving an indication correlative with the position of the tapering means in the channel means, means sensing gas pressure in said chamber, which pressure is affected by inflow of the liquid material and restriction of outflow of liquid material, and thereby sensing the viscosity of the material, and spring detent means to latch the channel means with respect to the tapered means in at least two different lengthwise position settings.

6. An apparatus for measuring the viscosity of a liquid material, comprising pressure chamber means into which the material is introduced, channel means providing a restricted passage for outlet of liquid from the lower part of the chamber means, the passage widening in the liquid outlet flow direction, means variably positionable within said passage to variably determine the cross-sectional area of the restricted passage, an indicator means mounted on the outside of the channel means, tubular structure at least part of which mounts the said means that is variably positionable, part of the tubular structure cooperating with the indicator means to indicate depth of penetration, of the means defined as variably positionable, into the restricted passage, viscosity measuring means sensing gas pressure in said chamber means, which pressure is affected by inflow of the liquid material and restriction of outflow of liquid material through said passage, the measuring means thereby sensing the viscosity of the material.

7. An appparatus for sensing the viscosity of a liquid material, comprising pressure chamber means into which the material is introduced, channel means providing a restricted passage for outlet of liquid from the lower part of the chamber means, the passage widening in the liquid outlet flow direction, means variably positionable within said passage to variably determine the cross-sectional area of the restricted passage, an indicator means mounted on the outside of the channel means, first tubular means for mounting the said means that is variably positionable, second tubular means for connection to said first tubular means and peripherally adjustable with respect thereto, fastening means to secure the second tubular means to the first tubular means in the adjusted position, detent means to provide at least two axially spaced settings of the second tubular means with respect to the channel means, an upper part of the second tubular means cooperating with the indicator means to indicate depth of penetration, of the means defined as variably positionable, into the restricted passage, means sensing gas pressure in said chamber means, which pressure is affected by inflow of the liquid material and restriction of outflow of liquid material through said passage, the sensing means thereby sensing the viscosity of the material.

8. The apparatus of claim 7, the detent means comprising a ball and spring mounted in the outer wall of the channel means, and axially spaced recesses provided at the inner side of the second tubular member for engagement with the ball.

9. In a system for sensing the viscosity of a liquid material comprising a source means for the liquid, a pressure chamber, propelling means to force the liquid material from the source means into the pressure chamber, the improvement comprising downwardly directed conduit means providing a downwardly diverging conical restricted passage for outlet of liquid from the pressure chamber under influence of gravity, upwardly tapering conical means upwardly adjustable in position, manually, in the lower outlet end of the conduit means, support means movably mounted upon the conduit means to support and to so adjust the tapering means in position, the tapering means being immovably supported by the support means when in operation position, the tapering angle of the conical means being greater than that of the conical passage, the angles being so correlated that the cross-sectional area of the flow path is substantially constant over the length of the conical passage, the pressure chamber having a second outlet normally communicating with the upper part thereof, to which second outlet the liquid has access when the liquid level rises abnormally, means connected to the second outlet to sense gas pressure in the upper part of said chamber, which pressure is affected by inflow of the liquid material and restriction of outflow of liquid material, and thereby sensing the viscosity of the material, and valve means preventing the escape of liquid from the pressure chamber through said second outlet.

10. A system for sensing the viscosity of a liquid material comprising a source means for the liquid, a pressure chamber, means to force the liquid material from the source means into the pressure chamber, channel means providing a restricted tapering passage for outlet of liquid from said chamber, the passage widening in the liquid outlet flow direction, tapered means variably positionable in a number of positions in said passage to variably determine the cross-sectional area of the restricted passage, a tubular, liquid outlet member to support the tapered means, said member having a maximum internal diameter greater than the largest diameter of the tapered means, the tubular liquid outlet member having interior screw threads, the channel means having exterior screw threads engaging the interior threads to provide mutual lengthwise adjustability, means sensing gas pressure in said chamber, which pressure is affected by inflow of the liquid material and restriction of outflow of liquid material, and thereby sensing the viscosity of the material, spring detent means to latch the channel means with respect to the tapered means in at least two different lengthwise position settings, and an indicator device provided on the channel means to indicate the depth of penetration of the tapered means into the tapering passage.

11. An apparatus for sensing the viscosity of a liquid material comprising pressure chamber means, means for forcing the material into said chamber, a conduit connected to the pressure chamber means for outflow of said liquid material, the conduit having formed on the lower outlet end thereof a downwardly directed channel means providing a restricted conical passage for outlet of liquid, under influence of gravity, from the lower part of the chamber means, the passage diverging downwardly in the liquid outlet flow direction, calibratable means manually settable in fixed position within said passage to determine the cross-sectional area of the restricted passage, said manually settable means comprising an upwardly movable and adjustable support means movably mounted upon the outside of said conduit, and an upwardly tapering conical member rigidly positioned by said support means within the lower outlet end of the channel means, the position of the support means giving an indication correlative with the position of the tapering member in the channel means, a vessel to receive the liquid material from said outlet end, said means for forcing the material withdrawing material from said vessel, means sensing gas pressure in said chamber means, which pressure is affected by inflow of the liquid material and restriction of outflow of liquid material through said passage, the sensing means thereby sensing the viscosity of the material.

12. An apparatus for sensing the viscosity of a liquid material comprising pressure chamber means, means for forcing the material into said chamber, downwardly directed channel means providing a restricted conical passage for outlet of liquid, under influence of gravity, from the lower part of the chamber means, the passage diverging in the liquid outlet flow direction, calibratable means manually settable in fixed position within said passage to determine the cross-sectional area of the restricted passage, said manually settable means comprising an upwardly movable and adjustable support means mounted upon said channel means, and an upwardly tapering conical member rigidly positioned by said support means within the lower outlet end of the channel means, the tapering angle of the conical means being greater than that of the conical passage, the angles being so correlated that the cross-sectional area of the flow path is substantially constant over the length of the conical passage, a vessel to receive the liquid material from said outlet end, said means for forcing the material withdrawing material from said vessel, means sensing gas pressure in said chamber means, which pressure is affected by inflow of the liquid material and restriction of outflow of liquid material through said passage, the sensing means thereby sensing the viscosity of the material.

References Cited in the file of this patent

UNITED STATES PATENTS

| | | |
|---|---|---|
| 53,721 | Wilson | Apr. 3, 1866 |
| 1,945,822 | Nivling | Feb. 6, 1934 |
| 2,012,550 | Powis | Aug. 27, 1935 |
| 2,022,578 | Thomas | Nov. 26, 1935 |
| 2,033,302 | Rockwell | Mar. 10, 1936 |
| 2,203,434 | Hartley | June 4, 1940 |
| 2,434,798 | Higgens | Jan. 20, 1948 |
| 2,859,768 | Teaque | Nov. 11, 1958 |